United States Patent [19]

Hirasawa

[11] Patent Number: 5,069,483
[45] Date of Patent: Dec. 3, 1991

[54] SEAT BELT MOUNT MECHANISM

[75] Inventor: Kiyoshi Hirasawa, Hamamatsu, Japan

[73] Assignee: Suzuki Motor company Limited, Japan

[21] Appl. No.: 537,359

[22] Filed: Jun. 13, 1990

[30] Foreign Application Priority Data

Jun. 14, 1989 [JP] Japan .................. 1-69184[U]

[51] Int. Cl.$^5$ .................................... B60R 21/10
[52] U.S. Cl. .................... 280/801; 280/802; 280/803; 280/808
[58] Field of Search ............ 280/801, 802, 803, 808; 296/146, 188

[56] References Cited

U.S. PATENT DOCUMENTS

| 4,189,169 | 2/1980 | Meuser | 280/808 |
| 4,220,353 | 9/1980 | Maekawa et al. | 280/801 |
| 4,264,089 | 4/1981 | Maekawa et al. | 280/808 |
| 4,322,095 | 3/1982 | Takizawa | 280/802 |

FOREIGN PATENT DOCUMENTS 0241035 10/1987 European Pat. Off. ............ 280/803

0172852 10/1982 Japan ............................ 280/808

Primary Examiner—Kenneth R. Rice
Assistant Examiner—Michael Shaughnessy
Attorney, Agent, or Firm—McGlew & Tuttle

[57] ABSTRACT

This invention is directed to a useful improvement in a seat belt mount mechanism of a seat belt for use in an automotive vehicle of the type that an anchor plate adapted to support the seat belt at the middle portion thereof is fixed securely to a door sash element of a vehicle body by way of a fixing bracket, and in which one end of the anchor plate is operatively introduced into an opening formed in a center pillar of a vehicle body in a state that a door is closed, wherein there is provided a latch engagement of a substantially T-shaped cross section at the leading of one end of the anchor plate. With this arrangement, the latch engagement of the anchor plate may positively be held from disengagement with the opening in the center pillar, when the door sash element of the vehicle body is deformed from a shock load, and also this possible deformation of the door sash element of the vehicle body from such a shock load may be prevented to a minimum.

3 Claims, 2 Drawing Sheets

SEAT BELT MOUNT MECHANISM

FIELD OF THE INVENTION AND RELATED ART STATEMENT

The present invention relates generally to an improvement relating to a seat belt mount mechanism for use in an automotive vehicle, and more particularly to an improvement in the construction of a passive-type seat belt mount mechanism for presenting an excellent combined effect of ready-to-take.

Recently, it has been an increasing trend from the guard standpoint to oblige passengers to make use of a seat belt while in the seat in a travelling passenger car or automotive vehicle, and hence in consideration of this trend, a variety of seat belt constructions have hitherto been employed in the passenger cars on the market. However, mainly from inconveniences or complexities in use of such seat belts, there are still existing many of drivers and/or passengers of passenger cars who would rather spare themselves the trouble of taking on such intricate-to-handle seat belts. In an attempt to cope with such an undesirable trend of vehicle's drivers and/or passengers, there has been proposed as a useful countermeasure the employment of the so-called passive type seat belt, which is specifically designed to automatically force a driver and/or passenger of a passenger car to have on a seat belt upon their being seated in a seat and upon the closing of a vehicle door. This passive type seat belt is generally of such a construction that a strip of seat belt is disposed extending trasversely over a seat from a rear part of the door sash to the center of a vehicle body in such a manner that a length of belt strip will be put forcibly around the chest of a driver or passenger at the moment that he or she sits in the vehicle's seat.

According to a typical construction of such a passive type seat belt arrangement, an anchor plate receiving a strip of seat belt therethrough is secured to a door sash element of a vehicle body by way of a fixing bracket in such a manner that one end of the anchor plate is introduced into an opening defined in the center pillar of the vehicle body upon the closing of a vehicle door. With this arrangement, when a substantial shock load is placed upon the seat belt, the end of the anchor plate is held securely by the opening of the center pillar, whereby part of the shock load rendered upon the seat belt is receivable also by this center pillar, not only by the door sash element.

In this respect, however, according to the typical arrangement of such a seat belt, it is to be noted that when a vehicle is given a substantial shock load like in a crash, a door sash may very possibly be deformed from this shock load, one end of the anchor plate may often come out of engagement with the center pillar of the vehicle body, whereby it would be impossible for the center pillar to serve to positively receive a shock load rendered upon the seat belt under such a crash situation.

This is considered to be disadvantageous for the achievement of the required performance which is essential in the design of a seat belt for the useful effect in distribution of shock loads.

OBJECT AND SUMMARY OF THE INVENTION

In an attempt to cope with such an undesired shortage in performance according to the conventional seat belt mount mechanism as noted above, the present invention is essentially directed to the provision of an improvement in construction to attain a due performance of a seat belt for an enhancement in the effect of receiving shock loads on the part of the center pillar.

This improvement in the seat belt mount mechanism for use in a vehicle in which an anchor plate adapted to support a seat belt is mounted operatively to a door sash element through a fixing bracket, and in which one end of the anchor plate is adapted to be introduced into an opening defined in the center pillar of a vehicle body while closing a door may be attained from the provision of an arrangement such that there is provided a latch engagement of a substantially T-shaped cross-section in one end portion of the anchor plate, upon which the shoulder anchor is supported operatively.

BRIEF DESCRIPTION OF THE DRAWINGS

In the accompanying drawings, like parts are designated by like reference numerals, and in which FIGS. 1 through 5 are a series of views showing a preferred embodiment of a seat belt mount mechanism according to the present invention; wherein FIG. 1 is a view showing one lateral side of an automotive vehicle;

FIG. 2 is an enlarged fragmentary view showing main elements of a seat belt mount mechanism, when installed in service position;

FIG. 3 is a horizontal cross-sectional view showing main elements, when installed, of the seat belt mount mechanism according to the present invention; and FIG. 4 is a fragmentary horizontal cross-sectional view showing the manner of installation of main elements of the seat belt mount mechanism; and FIG. 5 is a general perspective view showing a fixing bracket for the seat belt of the invention.

DETAILED DESCRIPTION OF A PREFERRED EMBODIMENT

The present invention will now be described in detail by way of a preferred embodiment thereof taking reference to the accompanying drawings.

FIG. 1 through 5 are a series of views showing a preferred embodiment of a seat belt mount mechanism for an automobile according to the present invention.

Figure 1:
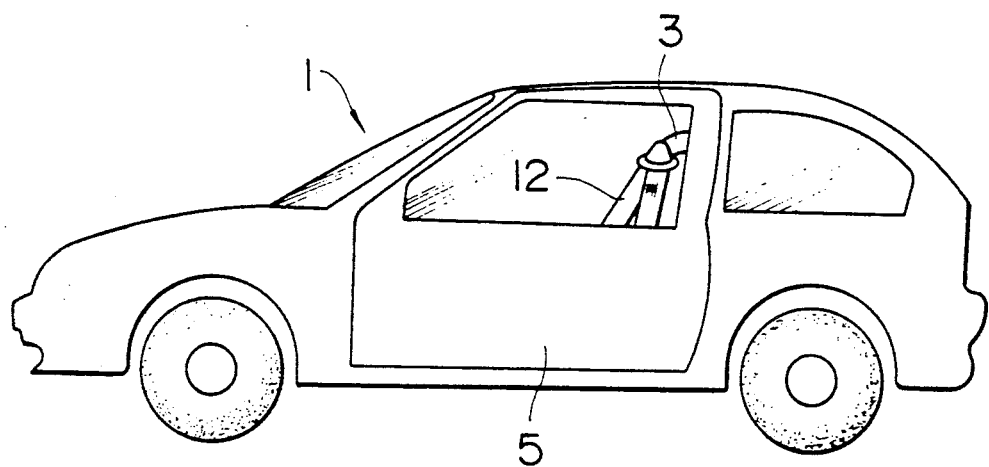
Figure 2:
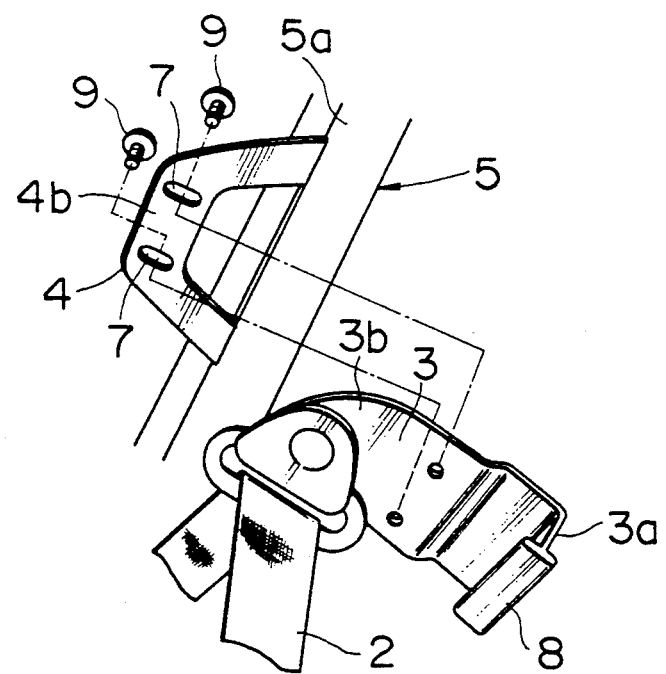
Figure 3:
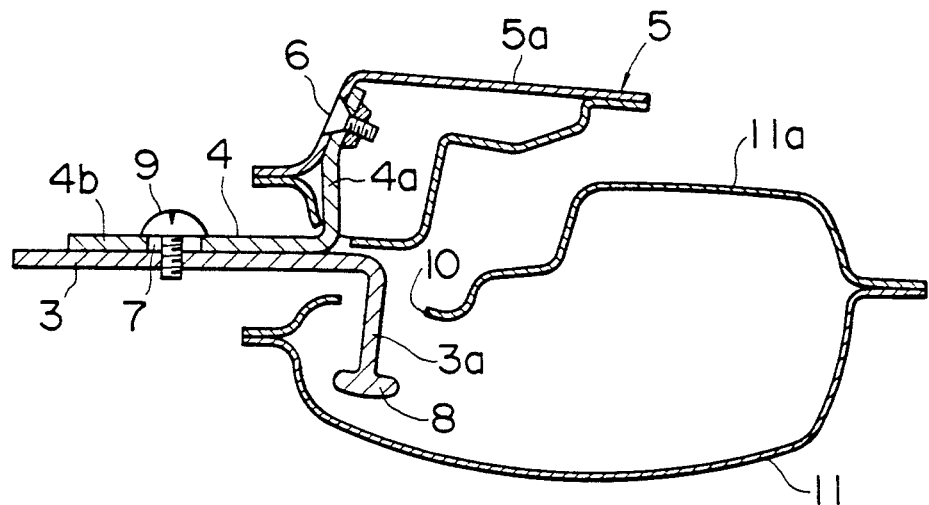

The seat belt mount mechanism by way of this preferred embodiment is such that an anchor plate 3 for receiving therethrough a seat belt 2 of an automotive vehicle at the middle portion thereof is secured operatively to a door sash element 5a for a vehicle door 5 by way of a fixing bracket 4, as typically shown in FIGS. 2 through 5, wherein there is shown the general arrangement of these elements disposed near the door 5 shown in FIG. 1. There is shown the fixing bracket 4 secured at one end 4a thereof to the door sash element 5a by using screws 6. Also, the fixing bracket 4 is provided with a pair of elongated openings 7, 7 at the other end 4b thereof, which are disposed extending generally longitudinally in the longitudinal direction of the vehicle 1, when installed in position.

The anchor plate 3 has its one end portion 3a bent at the approximately right angle in a substantially L-shape, which has in turn a latch engagement 8 of a substantially T-shape cross section at the leading end thereof. The anchor plate 3 is mounted securely at the center thereof onto the fixing bracket 4 by using screws 9, 9 extending through the pair of elongated openings 7, 7, and is adapted to operatively receive the seat belt 2 at the opposite end 3b thereof.

In addition, there is seen an opening 10 formed in a center pillar 11 of a vehicle body. One end 3a of the anchor plate 3 is to be introduced into opening 10, when a door 5 is closed.

Next, the reference is now made to the operation or effect of the improvement of the seat belt mount mechanism.

In a normal state when the door 5 is closed and opened for a driver and/or passengers to get on or off the vehicle, the one end 3a of the anchor plate 3 may be engaged with or disengaged from the opening 10 of the center pillar 11. (see FIG. 3)

Figure 4:
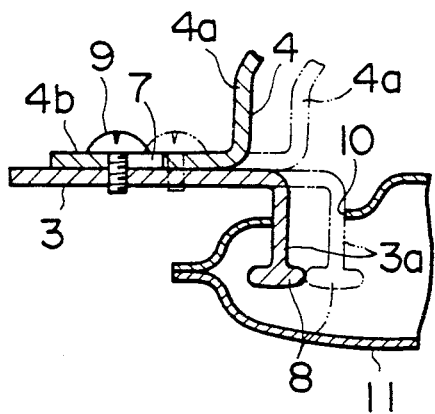

Now, when the door sash element 5a is deformed rearwardly by a shock load from the front of the vehicle 1 with the door 5 being closed, the anchor plate 3 may be caused to shift to a position as shown by a double-dot-and-broken line in FIG. 4, and the extremity or end portion of the latch engagement 8 at the leading end thereof may come into engagement with the opening 10 in the center pillar 11. With this arrangement, there is no longer a chance for the anchor plate 3 to get out of engagement with the center pillar 11, whereby there is attained such a desirable effect that a shock load rendered upon the seat belt may be received positively by the center pillar 11.

In addition to such an advantageous effect from the ensured engagement of the seat belt with the center pillar of the vehicle body according to the present invention, there is expectable such an extra advantage that the door sash element 5a may be prevented from being deformed not only forwardly but also rearwardly to a great extent by virtue of an added effect of weight load rendered upon the seat belt from a driver or passengers, accordingly.

Also, in a like condition that there is rendered a substantial shock load upon the seat belt 2 while the door 5 is held closed, the anchor plate 3 may be caused to shift longitudinally back and forth along the pair of elongated openings 7, 7 with respect to the fixing bracket 4 as the pair of elongated openings allow the screws 9, 9 to play therealong, whereby the one end 3a of the anchor plate 3 may move within the opening 10 defined in the center pillar 11 to an extent that the headed end of the latch engagement 8 may be held properly in the opening 10 as shown by a solid line in FIG. 4. In this position of engagement with the opening 10, there is no chance for the anchor plate 3 to get out of engagement with the center pillar 11, whereby a substantial load as rendered upon the seat belt 2 may so be received without fail by the center pillar 11, accordingly.

Figure 5:
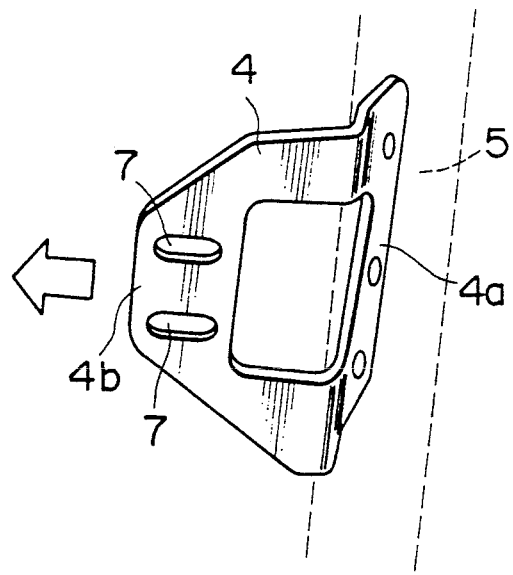

This is also indicated by an arrow in FIG. 5 which suggests a direction of load rendered upon the fixing bracket 4 from the seat belt 2.

As reviewed fully hereinbefore, according to the improvement in the construction of a seat belt mount of the present invention, wherein one end of the anchor plate is provided with a latch engagement of substantially T-shaped cross section, when the door sash element of a vehicle body is deformed not only longitudinally forwardly but also rearwardly of the vehicle body from a shock load, the latch engagement of the anchor plate may properly be held from disengagement with the center pillar, whereby even in an emergency that the door sash element may be deformed substantially in the longitudinal direction from a shock load rendered upon the seat belt, this shock load may be received positively by the center pillar, accordingly.

Also, with the provision of elongated openings for receiving screws in the fixing bracket adapted to support the anchor plate, when there is rendered a substantial shock load upon the seat belt, there is attained such advantageous effects that this shock load may be absorbed properly by allowing the anchor plate to play or slide longitudinally along the enlongated openings of the fixing bracket, and that the latch engagement of the anchor plate may be allowed to shift in the opening formed in the center pillar to be held positively. There is attainable such an additional advantageous effect to the above that a possible deformation of the door sash element of a vehicle body from such a shock load may be prevented to a minimum owing to a counter-effect of pulling rendered by the tension in the seat belt.

Lastly, it is to be understood that the appended claim is intended to cover all of such generic and specific features as are particular to the invention as disclosed herein and all statements relating to the scope of the invention, which as a matter of language might be said to fall thereunder.

I claim:

1. A seat belt mount mechanism of a seat belt for use in an automotive vehicle, comprising: a fixing bracket fixed to an upper part of a door sash, said fixing bracket extending laterally of said door sash; an anchor plate connected to said fixing bracket laterally of said door sash, said anchor plate having an end with a latch engagement portion having a substantially T-shaped cross section; an opening formed in a center pillar of the vehicle, said end of T-shaped cross section of said latch being inserted into the opening of the center pillar when the door is closed, said latch being directly received by the central pillar when the anchor plate is subjected to a heavy load.

2. A seat belt mount mechanism according to claim 1, wherein said fixing bracket is provided with an elongated opening to receive screws for securing said anchor plate, said elongated opening being formed extending in a longitudinal direction of a vehicle cabin.

3. A seat belt mount mechanism for an automotive vehicle, comprising: a door sash formed with at least a first door sash element and a second door sash element defining an interior door sash space; a fixing bracket including a portion extending into said door sash space; screw means extending into said door sash space, fixing said fixing bracket to said door sash element, a portion of said fixing element being disposed laterally of said door sash and including elongated openings; an anchor plate connected to said portion of said fixing bracket disposed laterally of said door sash by screws inserted through said elongated openings and connected to said anchor plates, said anchor plate having an L-shaped bend adjacent to said door sash with a latch engagement end of substantially T-shaped cross-section; a vehicle center pillar including an opening, said latch engagement end of said anchor plate being directly inserted into the opening of said center pillar when the door is closed, said anchor plate moving relative to said fixing bracket as said screw moves within said elongated hole upon a load being exerted on said anchor plate such that said latch engagement end of T-shaped cross-section engages said central pillar, within said opening.

* * * * *